(12) United States Patent
Deperrois et al.

(10) Patent No.: US 8,764,383 B2
(45) Date of Patent: Jul. 1, 2014

(54) ASSEMBLY FOR DRIVING GAS TURBINE ACCESSORIES

(75) Inventors: Andre Raymond Christian Deperrois, Paris (FR); Yvon Grand, Persan (FR); Cyril Franck Mouchnino, Paris (FR); Serge Dominique Pettinotti, Courbevoie (FR)

(73) Assignee: Hispano Suiza, Colombes (FR)

( * ) Notice: Subject to any disclaimer, the term of this patent is extended or adjusted under 35 U.S.C. 154(b) by 1056 days.

(21) Appl. No.: 12/401,147

(22) Filed: Mar. 10, 2009

(65) Prior Publication Data

US 2009/0232640 A1    Sep. 17, 2009

(30) Foreign Application Priority Data

Mar. 14, 2008  (FR) ...................................... 08 51690

(51) Int. Cl.
    *F02C 7/275*   (2006.01)
(52) U.S. Cl.
    USPC ............... 415/122.1; 60/788; 60/802; 60/787
(58) Field of Classification Search
    CPC .............. F02C 7/32; F02C 7/36; B64D 41/00
    USPC ............... 60/39.142, 39.141, 39.281; 244/60;
                                            290/22, 36; 415/122.1
    See application file for complete search history.

(56) References Cited

U.S. PATENT DOCUMENTS

| | | | | |
|---|---|---|---|---|
| 3,416,309 A | * | 12/1968 | Elmes et al. | ................. 60/39.15 |
| 3,514,945 A | * | 6/1970 | Austin | ............................ 60/791 |
| 5,161,365 A | * | 11/1992 | Wright | ............................ 60/780 |
| 5,349,814 A | * | 9/1994 | Ciokajlo et al. | ............. 60/226.1 |
| 5,555,722 A | * | 9/1996 | Mehr-Ayin et al. | ............. 60/788 |
| 5,716,423 A | * | 2/1998 | Krul et al. | ........................ 55/485 |
| 7,065,954 B2 | * | 6/2006 | Labala | ........................ 60/39.465 |
| 7,500,365 B2 | * | 3/2009 | Suciu et al. | ..................... 60/802 |
| 7,975,465 B2 | * | 7/2011 | Morris et al. | ............... 60/39.282 |
| 8,490,411 B2 | * | 7/2013 | Suciu et al. | ..................... 60/802 |
| 2005/0103931 A1 | | 5/2005 | Morris et al. | |

FOREIGN PATENT DOCUMENTS

WO    WO 92/05351    4/1992

* cited by examiner

*Primary Examiner* — Steven Loke
*Assistant Examiner* — David Goodwin
(74) *Attorney, Agent, or Firm* — Oblon, Spivak, McClelland, Maier & Neustadt, L.L.P.

(57) ABSTRACT

An assembly for driving accessories of a gas turbine is provided. The assembly includes: a gearbox having a front side face and a rear side face opposite the front face and having mounted therein a first gear train made up of three toothed wheels meshing with one another, and a second gear train made up of four toothed wheels meshing with one another; a power transmission shaft that is coupled in rotation with the first and second gear trains by a toothed wheel pair, and that emerges from the front side face of the gearbox; and nine distinct gas turbine accessories mounted against the side faces of the gearbox, and each including a respective drive shaft that is coupled in rotation with one of the toothed wheels of the two gear trains.

13 Claims, 3 Drawing Sheets

ASSEMBLY FOR DRIVING GAS TURBINE ACCESSORIES

BACKGROUND OF THE INVENTION

The present invention relates to the general field of gas turbines and it relates more particularly to the configuration of a gearbox for driving accessories of a gas turbine.

The field of application of the invention is that of gas turbines for airplane or helicopter engines, and also for auxiliary power units (APUs).

The gas turbine engines of airplanes or helicopters generally include a gearbox for driving a plurality of turbine accessories or pieces of auxiliary equipment, such as in particular various pumps for producing hydraulic energy, for feeding fuel, for lubrication, electricity generators for producing electrical power, etc. Such a gearbox is commonly referred to as an accessory gearbox (AGB).

In known manner, a gearbox for driving accessories comprises one of more gear trains, each made up of a plurality of toothed wheels that are driven in rotation by a power transmission shaft, which shaft is coupled to a shaft of the turbine. Each accessory is generally mounted against one of the side faces of the gearbox and includes a drive shaft that is coupled to one of the toothed wheels of the gear train(s). When the turbine is in operation, a fraction of the mechanical power that it generates is taken from the turbine shaft and is transmitted via the power transmission shaft and the gear trains to the various accessories mounted on the gearbox in order to actuate them.

Accessory drive gearboxes vary in particular as a function of the number and the nature of the accessories to be driven. When designing an accessory drive gearbox, it is nevertheless important to keep down the size and the weight of the gearbox to as small as possible, in particular by acting on the positioning of the accessories relative to one another as a function of their individual sizes and of their speeds of rotation. Unfortunately, presently-known accessory drive gearboxes generally present size and weight that are excessive.

OBJECT AND SUMMARY OF THE INVENTION

A main object of the present invention is thus to mitigate such drawbacks by proposing an assembly for driving gas turbine accessories that enables its volume and size to be reduced considerably.

This object is achieved with an assembly comprising:
a gearbox having a front side face and a rear side face opposite the front face and having mounted therein a first gear train made up of three toothed wheels meshing with one another, and a second gear train made up of four toothed wheels meshing with one another;
a power transmission shaft that is coupled in rotation with the first and second gear trains by means of a toothed wheel pair, and that emerges from the front side face of the gearbox; and
nine distinct gas turbine accessories mounted against the side faces of the gearbox, and each including a respective drive shaft that is coupled in rotation with one of the toothed wheels of the two gear trains.

The use of only eight toothed wheels (the toothed wheel pair of the power transmission shaft and the seven toothed wheels of the two gear trains) distributed in two gear trains for delivering power to nine distinct accessories makes it possible to reduce significantly the total weight and size of the assembly.

In an advantageous disposition, two of the accessories have their respective drive shafts coupled in rotation with the same toothed wheel of one of the two gear trains, each accessory being mounted against a respective one of the side faces of the gearbox.

In another advantageous disposition, six accessories are mounted against the rear side face of the gearbox and three accessories are mounted against the front side face of the gearbox.

In yet another advantageous disposition, the accessories comprise: two electricity generators for delivering electrical power; a permanent magnet alternator for delivering electricity to equipment of the gas turbine; a starter for starting the gas turbine; two hydraulic pumps for delivering oil under pressure; a main oil pump; a main fuel pump; and a centrifugal deoiler.

Under such circumstances, the two electricity generators have their respective drive shafts coupled in rotation with two adjacent toothed wheels of the first gear train, each generator being mounted against a respective one of the side faces of the gearbox. Such a disposition of the electricity generators presents the advantage of ensuring balanced distribution of the weights of the assembly.

Furthermore, the permanent magnet alternator has its drive shaft coupled in rotation with the remaining toothed wheel of the first gear train, and is mounted against the rear side face of the gearbox.

The starter may be mounted against the rear side face of the gearbox and its drive shaft may be coupled in rotation with the toothed wheel pair. As a result, the path for driving the engine when starting does not pass through any of the gear trains.

Finally, the two hydraulic pumps, the centrifugal deoiler, and the oil and fuel pumps advantageously have their respective drive shafts coupled in rotation with corresponding ones of the toothed wheels of the second gear train, the two hydraulic pumps and the centrifugal deoiler being mounted against the rear side face of the gearbox and the oil and fuel pumps being mounted against the front side face of the gearbox.

In yet another advantageous disposition, the power transmission shaft is substantially conical in shape and is held, at one end, firstly radially by a roller bearing and secondly axially by a ball bearing, and at its opposite end, radially by fluting for transmitting torque to the toothed wheel pair. Such an arrangement makes it possible to contribute to reducing the overall weight of the assembly by avoiding any need for an additional rolling bearing for guiding the shaft where it is assembled to the gearbox.

In yet another advantageous disposition, the gearbox has a plurality of straight ducts connected to one another to form a circuit for conveying lubricating oil to the toothed wheels of both gear trains, each duct opening out at one end in a top face of the gearbox. Preferably, the gearbox is a metal part made by casting, with the locations of the ducts for conveying lubricating oil being prepared by solid cylindrical volumes suitable for being drilled directly from the top face of the gearbox. This leads to simplification when making the assembly.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
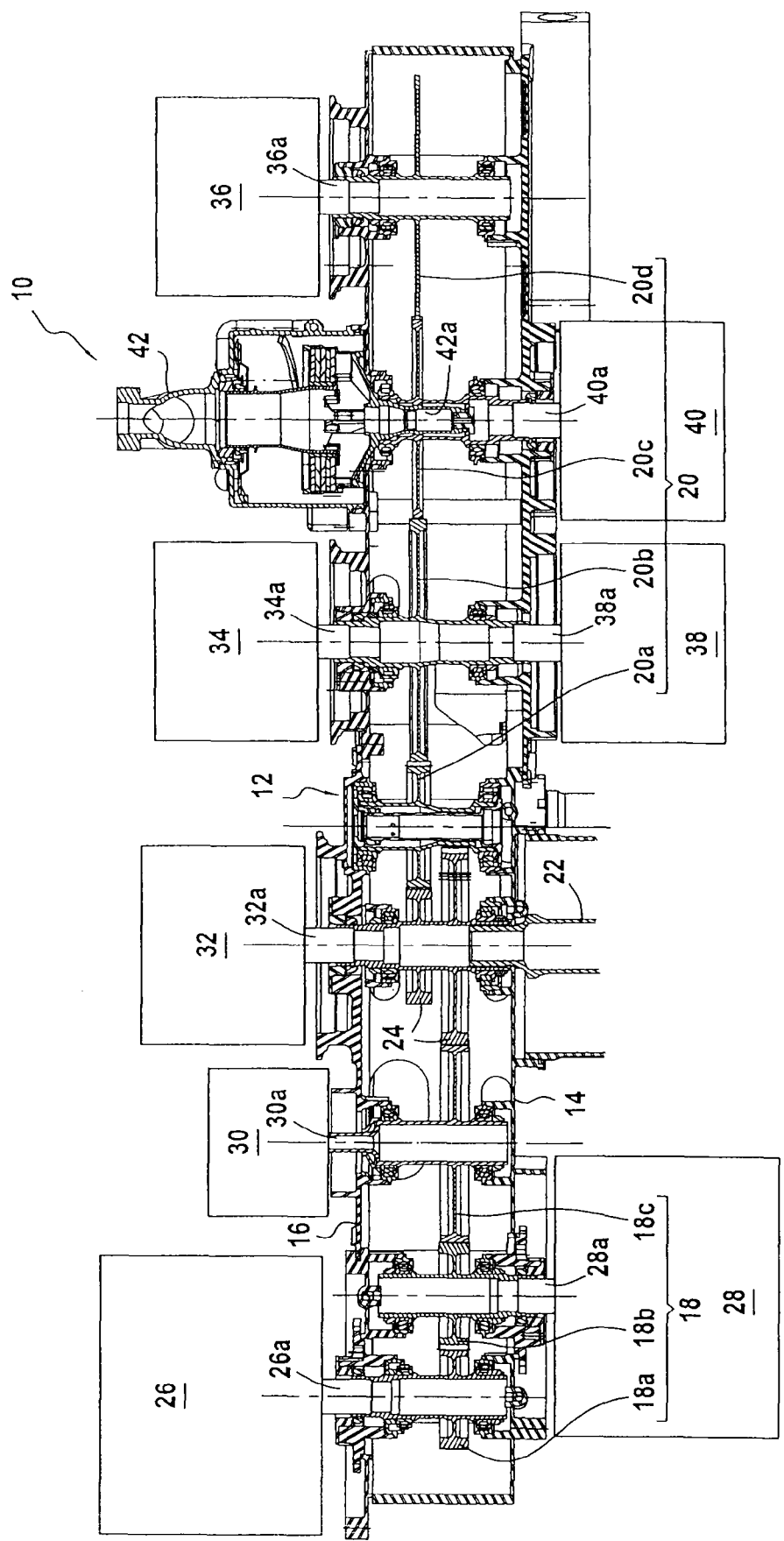
FIG. 1 is a longitudinal section view of an assembly for driving accessories in accordance with the invention.

FIG. 1 is a longitudinal section of an assembly 10 for driving accessories of an airplane gas turbine. Naturally, the invention also applies to helicopter engine gas turbines, and also to auxiliary power units.

The assembly 10 comprises in particular a substantially rectangular gearbox 12 having a front side face 14 and a rear side face 16 opposite the front face.

The gearbox 12 houses two gear trains that extend in a longitudinal direction, namely: a first gear train 18 made up of three toothed wheels 18a to 18c that mesh with one another, and a second gear train 20, different from the first, made up of four toothed wheels 20a to 20d that mesh with one another.

A power transmission shaft 22 (shown in part in FIG. 1) takes mechanical power from a shaft of the turbine (not shown in the figures), and transmits it to the two gear trains 18 and 20. For this purpose, the power transmission shaft 22 is coupled to rotate with both gear trains by means of a pair of toothed wheels 24. Furthermore, the power transmission shaft emerges from the front side face 14 of the gearbox 12, substantially perpendicularly thereto.

The two gear trains 18 and 20 as described above serve to drive a plurality of distinct accessories of the turbine in rotation. More precisely, in the invention, these gear trains transmit the mechanical power taken from the turbine shaft to nine distinct accessories each mounted on one of the side faces 14 and 16 of the gearbox 12.

These nine accessories are constituted by: two electricity generators 26 and 28 for delivering electrical power (e.g. to the airplane propelled by the engine); a permanent magnet alternator (PMA) 30 for delivering electricity to equipment of the engine; a starter 32 for starting the engine; two hydraulic pumps 34 and 36 for delivering oil under pressure to the engine and/or to its equipment; a main oil pump 38 for delivering lubricating oil to the oil circuit of the engine and/or its equipment; a main fuel pump 40; and a centrifugal deoiler 42 (passive device).

Each of the accessories 26 to 42 is mounted on one of the side faces 14, 16 of the gearbox 12. Each accessory 26 to 42 also has a drive shaft 26a to 42a that is mounted on a toothed wheel of one of the gear trains in order to be driven.

In order to enable the nine accessories to be driven from only eight toothed wheels (i.e. the toothed wheel pair 24 of the power transmission shaft 22, and the seven toothed wheels 18a-18c and 20a-20d of the two gear trains), two accessories have their drive shafts coupled in rotation with a common toothed wheel and they are mounted against different side faces of the gearbox.

Thus, in the embodiment of FIG. 1, one of the hydraulic pumps 34 and the main oil pump 38 are mounted respectively on the rear side face 16 and on the front side face 14 of the gearbox and they have their respective drive shafts 34a and 38a coupled to rotate with the same toothed wheel 20b of the second gear train 20.

The accessories 26 to 42 have volumes and speeds of rotation that differ (with the exception here of the hydraulic pump 34 and the oil pump 38 that have the same speed of rotation since they are mounted on the same toothed wheel). It is necessary for them to be mounted on the gearbox in such a manner as to take these parameters into account while also optimizing the space occupied by and the distribution of the weights of the assembly.

For this purpose, the first gear train 18 of the assembly of the invention is a gear train dedicated to driving accessories with high speeds of rotation (greater than 10,000 revolutions per minute (rpm)). The second gear train 20 is more specifically dedicated to driving accessories having slower speeds of rotation (lower than 10,000 rpm). Such a distribution on a "fast" gear train and a "slow" gear train makes it possible to avoid making use of large toothed wheels for adjusting the speeds of the various accessories, and thus contributes to reducing the total size and weight of the assembly.

The first gear train 18 thus drives the two electricity generators 26 and 28 and the permanent magnet alternator 30 since their speeds of rotation are greater than 10,000 rpm. The second gear train 20 drives the remaining accessories 32 to 42 that present slower speeds of rotation.

More precisely, the two electricity generators 26 and 28 have their respective drive shafts 26a and 28a coupled to rotate with two adjacent toothed wheels (respectively 18a and 18b in FIG. 1) of the first gear train, and each of them is mounted against one of the side faces of the gearbox. Such a disposition on either side of the gearbox serves to balance the total weight of the assembly (these two accessories being heavier than the other accessories).

The permanent magnet alternator 30 has its drive shaft 30a coupled to rotate with the remaining toothed wheel 18c of the first gear train and it is mounted against the rear side face 16 of the gearbox.

The starter 32 is also mounted against the rear side face 16 of the gearbox and its drive shaft 32a is coupled to rotate with the gearwheel pair 24.

Finally, the remaining hydraulic pump 36, the fuel pump 40, and the centrifugal deoiler 42 have their respective drive shafts (36a, 40a, 42a) coupled to rotate with the remaining toothed wheels (namely 20c and 20d) of the second gear train 20, the two hydraulic pumps and the centrifugal deoiler being mounted against the rear side face 16 of the gearbox, and the oil and fuel pumps being mounted against the front side face 14 of the gearbox.

It should be observed that the remaining toothed wheel 20a of the second gear train 20 does not drive any accessory in rotation, its function being to transmit power to the accessories of the second gear train and to increase the extent to which they are spaced apart.

Such a disposition of the various accessories on the gearbox makes it possible to obtain firstly reduced overall size and weight (only eight toothed wheels are needed to drive nine accessories), and secondly to obtain a balanced distribution of weights on the gearbox.

Figure 2:
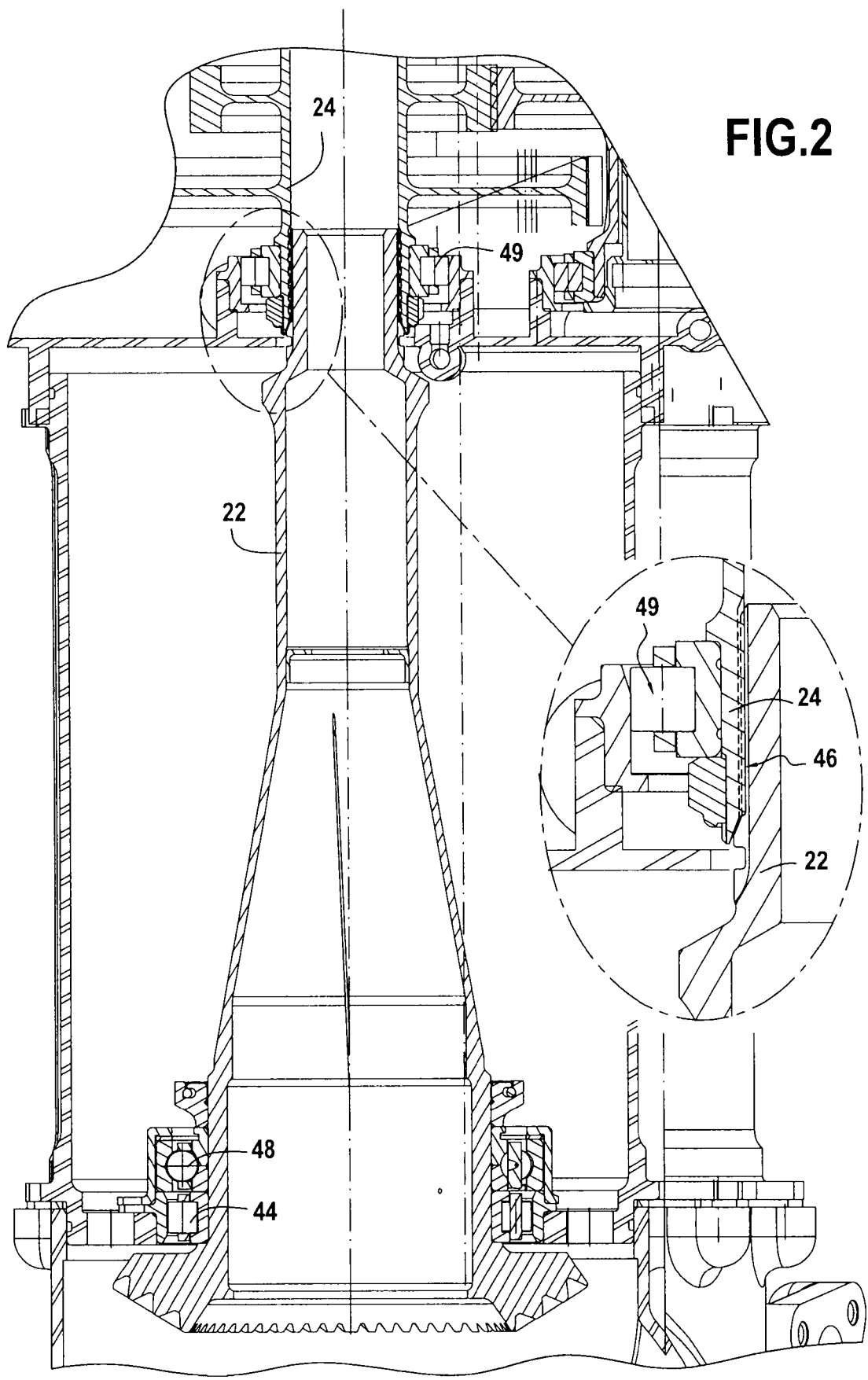
FIG. 2 is an enlargement of a portion of FIG. 1 showing how the power transmission shaft is mounted on the gearbox.

According to another aspect of the invention, shown more clearly in FIG. 2, the power transmission shaft 22 presents a substantially conical shape and it is held at one end firstly radially by a roller bearing 44 and secondly axially by a ball bearing 48, and at its opposite end radially by fluting 46 for transmitting torque to the gearwheel pair 24.

Such an arrangement thus makes it possible to omit having an additional rolling bearing of the kind that is usually needed for assisting in guiding the shaft where it is mounted on the gearbox. As a result, the total weight of the assembly can be further reduced.

It should be observed that an additional roller bearing 49 situated at the end of the power transmission shaft 22 having fluting 46 also serves to take up the radial loads acting thereon.

Figure 3:
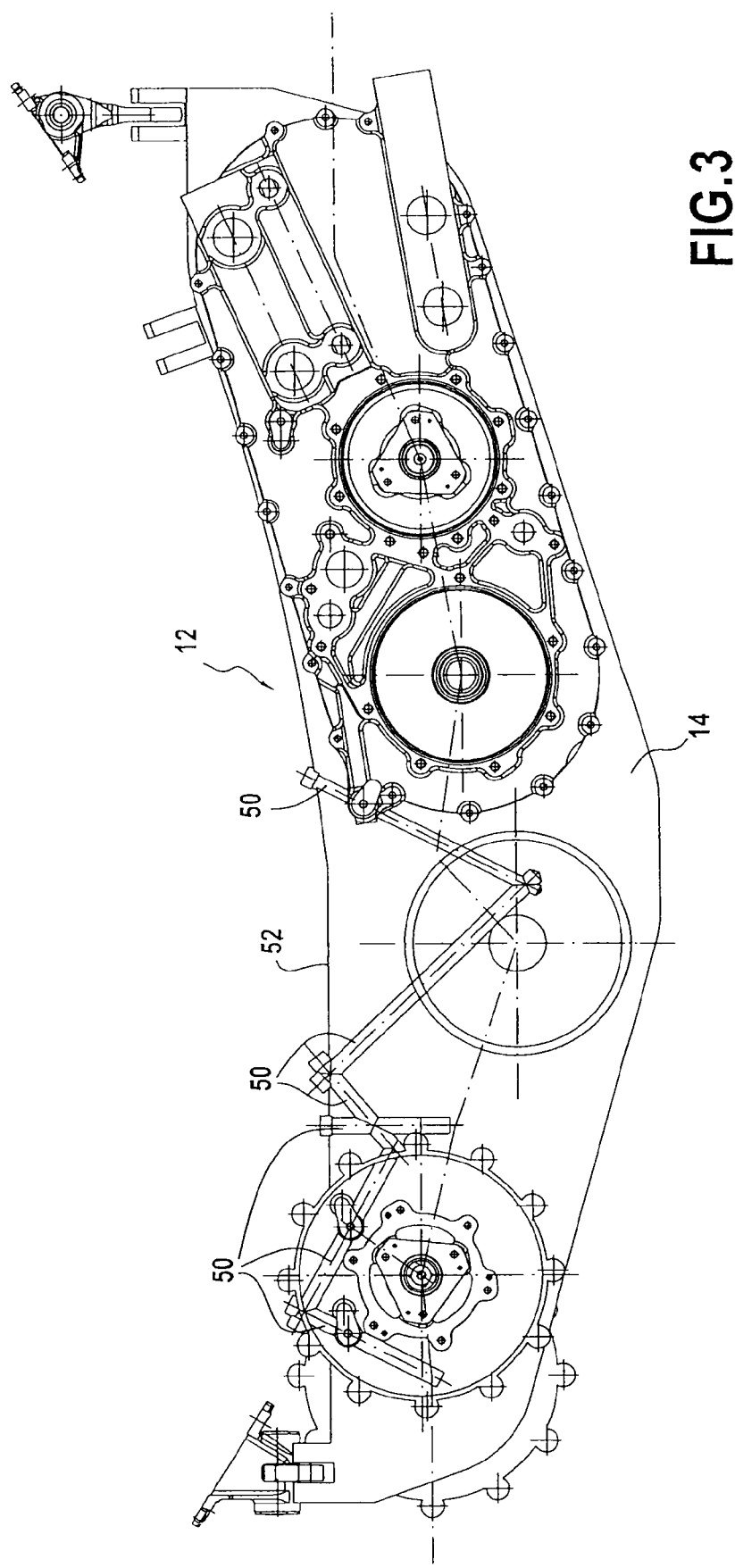
FIG. 3 shows the FIG. 1 assembly seen from the front side face of the gearbox.

According to yet another aspect of the invention, as shown in FIG. 3, the gearbox 12 has on its front side face 14 a plurality of ducts 50 (six shown in FIG. 3) that are interconnected to form a path for conveying lubricating oil to the toothed wheels of the two gear trains.

These ducts 50 for conveying lubricating oil have the particular feature of being substantially straight and of opening out at each end to the top face 52 of the gearbox. Thus, since the gearbox 12 is a metal part made by casting, the locations of the ducts 50 for conveying lubricating oil can be prepared by solid cylindrical volumes that are subsequently drilled through directly from the top face 52 of the gearbox. This leads to simplification when making the assembly of the invention.

What is claimed is:

1. An assembly for driving accessories of a gas turbine, the assembly comprising:
    a gearbox having a front side face and a rear side face opposite the front face and having mounted therein a first gear train made up of first, second, and third toothed wheels meshing with one another, and a second gear train made up of first, second, third, and fourth toothed wheels meshing with one another;
    a power transmission shaft that is coupled in rotation with the first and second gear trains by a toothed wheel pair, and that emerges from the front side face of the gearbox;
    nine distinct gas turbine accessories mounted against the side faces of the gearbox, and each including a respective drive shaft that is coupled in rotation with one of the toothed wheels of the two gear trains, the accessories comprising first and second electricity generators for delivering electrical power; a permanent magnet alternator for delivering electricity to equipment of the gas turbine; a starter for starting the gas turbine; first and second hydraulic pumps for delivering oil under pressure; a main oil pump for delivering lubricating oil to an oil circuit; a main fuel pump; and a centrifugal deoiler,
    wherein the drive shafts of the first and second electricity generators and the permanent magnet alternator are coupled to the toothed wheels of the first gear train and the drive shafts of the starter, the first and second hydraulic pumps, the main oil pump, the main fuel pump, and the centrifugal deoiler are coupled to the toothed wheels of the second drive train,
    wherein the drive shafts of the first hydraulic pump and the main oil pump are both coupled in rotation with the second toothed wheel of the second gear train, the main oil pump being mounted against the front side face of the gearbox and the first hydraulic pump being mounted against the rear side face of the gearbox.

2. An assembly according to claim 1, wherein six accessories are mounted against the rear side face of the gearbox and three accessories are mounted against the front side face of the gearbox.

3. An assembly according to claim 1, wherein the first and second electricity generators have their respective drive shafts coupled in rotation with the second and third toothed wheels of the first gear train, respectively, the first generator being mounted against the front side face of the gearbox and the second generator being mounted against the rear side face of the gearbox.

4. An assembly according to claim 3, wherein the permanent magnet alternator has its drive shaft coupled in rotation with the first toothed wheel of the first gear train, and is mounted against the rear side face of the gearbox.

5. An assembly according to claim 1, wherein the starter is mounted against the rear side face of the gearbox and its drive shaft is coupled in rotation with the toothed wheel pair.

6. An assembly according to claim 1, wherein the drive shafts of the centrifugal deoiler and the fuel pump are both coupled in rotation with the third toothed wheel of the second gear train, the drive shaft of the second hydraulic pump is coupled in rotation with the fourth toothed wheel of the second gear train, the second hydraulic pump and the centrifugal deoiler being mounted against the rear side face of the gearbox and the fuel pump being mounted against the front side face of the gearbox.

7. An assembly according to claim 1, wherein the power transmission shaft is substantially conical in shape and is held, at one end, firstly radially by a roller bearing and secondly axially by a ball bearing, and at its opposite end, radially by fluting for transmitting torque to the toothed wheel pair.

8. An assembly according to claim 1, wherein the gearbox has a plurality of straight ducts connected to one another to form a circuit for conveying lubricating oil to the toothed wheels of both gear trains, each duct opening out at one end in a top face of the gearbox.

9. An assembly according to claim 8, wherein the gearbox is a metal part made by casting, with the locations of the ducts for conveying lubricating oil being prepared by solid cylindrical volumes suitable for being drilled directly from the top face of the gearbox.

10. An assembly according to claim 6, wherein the first toothed wheel of the second gear train does not drive one of the accessories.

11. An assembly according to claim 10, wherein a first gear of the toothed wheel pair meshes with the first toothed wheel of the first gear train, and a second gear of the toothed wheel pair meshes with the first toothed wheel of the second gear train.

12. An assembly according to claim 1, wherein the accessories coupled to the first gear train are driven at a rotation speed greater than 10,000 revolutions per minute and the accessories coupled to the second gear train are driven at a rotation speed lower than 10,000 revolutions per minute.

13. An assembly according to claim 11, wherein the second toothed wheel of the first gear train is disposed between the first and third toothed wheels of the first gear train, and the second toothed wheel of the second gear train is disposed between the first and third toothed wheels of the second gear train.

* * * * *